(12) United States Patent
Vander Lind (10) Patent No.: US 9,745,962 B2
(45) Date of Patent: Aug. 29, 2017

(54) RADIATOR CONFIGURATION FOR A FLYING WIND TURBINE THAT PASSIVELY CONTROLS AIRFLOW

(71) Applicant: X Development LLC, Mountain View, CA (US)

(72) Inventor: Damon Vander Lind, Alameda, CA (US)

(73) Assignee: X Development LLC, Mountain View, CA (US)

( * ) Notice: Subject to any disclaimer, the term of this patent is extended or adjusted under 35 U.S.C. 154(b) by 524 days.

(21) Appl. No.: 14/202,979

(22) Filed: Mar. 10, 2014

(65) Prior Publication Data

US 2015/0251763 A1 Sep. 10, 2015

(51) Int. Cl.
*F03D 80/60* (2016.01)
*F03D 80/00* (2016.01)

(52) U.S. Cl.
CPC .............. *F03D 80/00* (2016.05); *F03D 80/60* (2016.05); *F05B 2240/921* (2013.01); *F05B 2260/64* (2013.01); *Y02E 10/72* (2013.01)

(58) Field of Classification Search
CPC ....................................................... F03D 80/60
USPC .......................................................... 165/41
See application file for complete search history.

(56) References Cited

U.S. PATENT DOCUMENTS

| 1,452,958 | A | * | 4/1923 | Curran | B64D 33/10 123/41.04 |
| 1,714,804 | A | * | 5/1929 | Mummert | B64D 33/10 244/55 |
| 1,714,842 | A | * | 5/1929 | Beisel | B64D 33/10 244/55 |
| 1,890,931 | A | * | 12/1932 | Briner | B64C 1/00 244/55 |
| 2,156,288 | A | * | 5/1939 | Holliday | B64C 37/00 180/7.4 |
| 2,175,432 | A | * | 10/1939 | Gerstung | F01P 3/18 123/41.04 |
| 4,523,603 | A | | 6/1985 | Peikert | |
| 5,971,000 | A | | 10/1999 | Koncsek et al. | |
| 6,282,881 | B1 | | 9/2001 | Beutin et al. | |
| 7,427,048 | B2 | | 9/2008 | Ouellette | |
| 8,096,104 | B2 | | 1/2012 | Gilbert | |

* cited by examiner

*Primary Examiner* — Ljiljana Ciric
*Assistant Examiner* — Alexis Cox
(74) *Attorney, Agent, or Firm* — McDonnell Boehnen Hulbert & Berghoff LLP (57) ABSTRACT

Disclosed herein are systems for controlling the amount of airflow across a radiator within an aerial vehicle radiator duct. A rigid member of a moveable flow restrictor is rotatable between an open position and a closed position. While subject to a g-force less than a threshold value in a triggering direction, the rigid member is oriented in the open position and, while subject to a g-force greater than the threshold value in the triggering direction, the rigid member is oriented in the closed position. The amount of the airflow across the radiator while the rigid member is in the open position is different than the amount of the airflow across the radiator while the rigid member is in the closed position.

4 Claims, 8 Drawing Sheets

Section A-A

Fig. 6

Section A-A

RADIATOR CONFIGURATION FOR A FLYING WIND TURBINE THAT PASSIVELY CONTROLS AIRFLOW

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

SUMMARY

Radiator ducts with passively controlled variable airflow rates for airborne wind turbines are described herein. More specifically, example embodiments generally relate to radiator ducts that include a moveable flow restrictor. Beneficially, embodiments described herein may provide a passive mechanism for providing variable amounts for airflow to a radiator within the radiator duct, depending on operating conditions of the airborne wind turbine, and thereby reducing system drag on the airborne wind turbine.

In one aspect, an example system comprises an aerial vehicle, a radiator duct, a radiator, and a moveable flow restrictor. The radiator duct comprises an airflow inlet, and internal cavity, and an airflow outlet. The radiator is located within the internal cavity of the radiator duct and is subject to an airflow through the radiator duct. The moveable flow restrictor is configured to: (i) when the flow restrictor is subject to a g-force less than a threshold value in a triggering direction, move to an open position and allow a first rate of airflow through the duct; and (ii) when the flow restrictor is subject to a gforce greater than the threshold value in the triggering direction, move to a closed position and allow a second rate of airflow through the duct. The first amount of airflow is accordingly different than the second amount of airflow.

In another aspect, a moveable flow restrictor is configured to: (i) when the flow restrictor is subject to an airflow velocity at the airflow inlet less than a threshold value, move to an open position and allow a first rate of airflow through the duct; and (ii) when the flow restrictor is subject to an airflow velocity at the airflow inlet is greater than a threshold value, move to a closed position and allow a second rate of airflow through the duct. The first amount of airflow is accordingly be different than the second amount of airflow.

In a further aspect, an example aerial vehicle cooling system may comprise an aerial vehicle, a pylon supporting a rotor assembly, a radiator duct, a radiator, and a moveable flow restrictor. The pylon may be an airfoil with a high pressure side and an opposing low-pressure side. The radiator duct may comprise an airflow inlet, and internal cavity, and an airflow outlet and be located at least partially internal to the high pressure side of the pylon and inline with a wake created by the rotor assembly. The radiator may be located within the internal cavity of the radiator duct and be subject to an airflow through the radiator duct. The moveable flow restrictor may comprise a flexible member. A first portion of the flexible member may be fixed to aerial vehicle. A second portion of the flexible member may be configured to: (i) when the flow restrictor is subject to a g-force less than a threshold value in a triggering direction, move to an open position and allow a first rate of airflow through the duct; and (ii) when the flow restrictor is subject to a g-force greater than the threshold value in the triggering direction, move to a closed position and allow a second rate of airflow through the duct. The first amount of airflow may accordingly be different than the second amount of airflow.

These as well as other aspects, advantages, and alternatives, will become apparent to those of ordinary skill in the art by reading the following detailed description, with reference where appropriate to the accompanying drawings.

DETAILED DESCRIPTION

Exemplary methods and systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed methods systems and can be arranged and combined in a wide variety of different configurations, all of which are contemplated herein. Further, unless otherwise indicated, Figures are not drawn to scale and are used for illustrative purposes only.

I. OVERVIEW

Airborne wind turbines may include onboard motors, generators, and/or motor/generator hybrids on their associated aerial vehicles. A motor may be used to provide thrust to an aerial vehicle, and a generator may be used to generate electricity via drag imposed on the aerial vehicle. During operation, motor/generators generally generate more waste heat than is practical or efficient for continuous operation and they must reject the excess heat through cooling apparatuses, such as remote radiators. In general, the greater the cooling capacity provided to a motor/generator, the greater the torque capacity that may be utilized for that motor/generator.

An aerial vehicle may see a range of air velocities during operation. In general, air velocity across the aerial vehicle will be a determining factor in the total cooling capacity of a given cooling system on an aerial vehicle. However, the required cooling capacity of the vehicle may change depending on its operational mode. For example, an aerial vehicle in a hover mode, where the rotors are providing thrust, may require more cooling capacity than an aerial vehicle in a cross wind flight mode where the rotors are creating drag and generating electricity. Additionally, under some conditions, the aerial vehicle may experience a mean velocity of airflow greater than is required to actually cool the motor/generator. Because cooling requires drag, and drag reduces system performance, it may be desirable to limit the airflow seen by the cooling system under that condition.

Some operational modes, such as hover and crosswind flight and their related cooling requirements, may be correlated with certain flight conditions. For example, an aerial vehicle in hover mode may experience relatively low air velocity and/or a relatively low g-force loading, while also requiring a relatively high cooling capacity due to work performed by the motors to maintain hover. In that case, it would be desirable to have maximum airflow across the radiators. As another example, an aerial vehicle in crosswind flight mode may experience relatively high air velocity and/or a relatively high g-force loading in one or more directions, but the mean air velocity may be greater than is required to actually cool the generators. Therefore, it would be desirable to limit the airflow across the radiators in order to reduce inefficient drag. Preferably, a passive mechanism may react to these flight conditions and alternately restrict or allow airflow across the radiators. Beneficially, by reducing the airflow across the radiator when it is not required, drag may be reduced and system performance increased. Additionally, a passive mechanism may be less costly and more robust than an active system that may require sensors, servos, and other complex parts.

II. ILLUSTRATIVE SYSTEMS

A. Airborne Wind Turbine (AWT)

Figure 1:
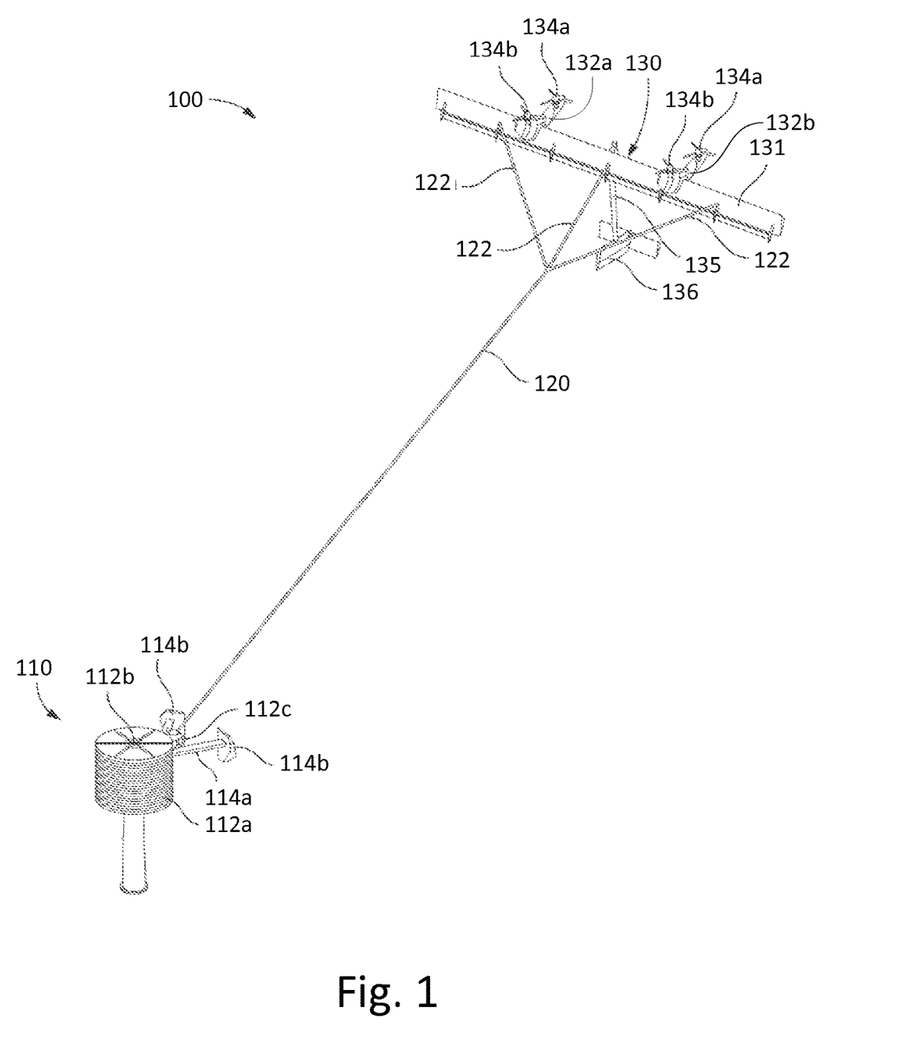
FIG. 1 depicts an Airborne Wind Turbine (AWT), according to an example embodiment.

FIG. 1 depicts an AWT 100, according to an example embodiment. In particular, the AWT 100 includes a ground station 110, a tether 120, and an aerial vehicle 130. An aerial vehicle may include or take the form of various types of devices, such as a kite, a helicopter, a wing and/or an airplane, among other possibilities. An aerial vehicle may be formed of solid structures of metal, plastic and/or other polymers. An aerial vehicle may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be possible as well.

As shown in FIG. 1, the aerial vehicle 130 may be connected to the tether 120 via a bridle portion 122 of the tether 120, and the tether 120 may be connected to the ground station 110. In this example, the tether 120 may be attached to the ground station 110 at one location on the ground station 110, and attached to the aerial vehicle 130 via the bridle at three locations on the aerial vehicle 130. However, in other examples, the tether 120 may be attached via the bridle at one or more locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the aerial vehicle 130 is possible. Further, the ground station 110 may be further configured to receive the aerial vehicle 130 during a landing. The ground station 110 may be formed of any material that can suitably keep the aerial vehicle 130 attached and/or anchored to the ground while in hover flight, forward flight, crosswind flight. In some implementations, a ground station 110 may be configured for use on land. However, a ground station 110 may also be implemented on a body of water, such as a lake, river, sea, or ocean. For example, a ground station could include or be arranged on a floating off-shore platform or a boat, among other possibilities. Further, a ground station 110 may be configured to remain stationary or to move relative to the ground or the surface of a body of water.

The ground station 110 may additionally include one or more components, such as winch componentry 112a, 112b, 112c that may be used to vary the deployed length of the tether 120. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, one or more components 114a, 114b may be configured to receive the aerial vehicle 130.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. The core may be constructed of any high strength fibers. In some examples, the tether 120 may have a fixed length and/or a variable length. For instance, in at least one such example, the tether 120 may have a length of 140 meters.

Figure 2:
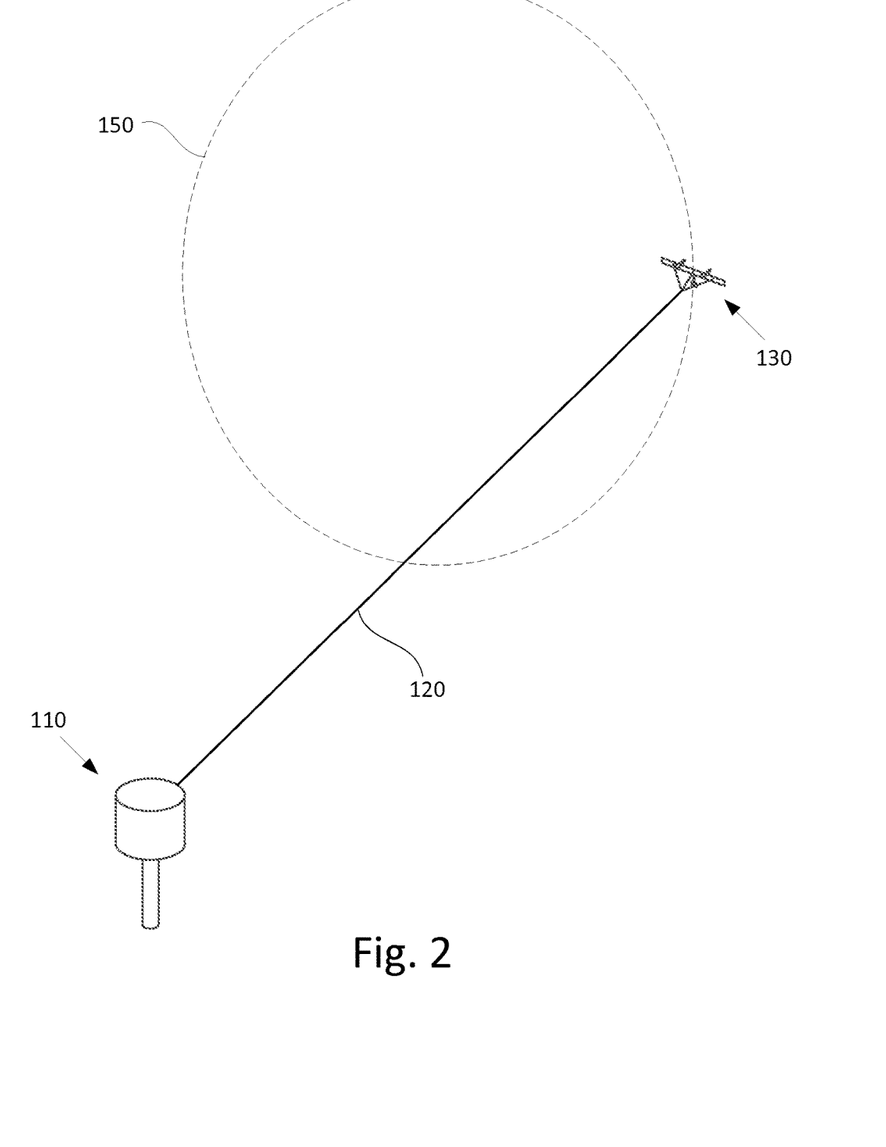
FIG. 2 depicts an example of an aerial vehicle transiting an illustrative flight path.

Referring briefly to FIG. 2, the aerial vehicle 130 may be configured to fly substantially along a path 150 to generate electrical energy. The term "substantially along," as used in this disclosure, refers to exactly along and/or one or more deviations from exactly along that do not significantly impact generation of electrical energy as described herein and/or transitioning an aerial vehicle between certain flight modes as described herein. The path 150 may be various different shapes in various different embodiments. For example, the path 150 may be substantially circular. And in at least one such example, the path 150 may have a radius of up to 265 meters. The term "substantially circular," as used in this disclosure, refers to exactly circular and/or one or more deviations from exactly circular that do not significantly impact generation of electrical energy as described herein. Other shapes for the path 150 may be an oval, such as an ellipse, the shape of a jelly bean, the shape of the number of 8, etc.

Referring again to FIG. 1, the aerial vehicle 130 may include a main wing 131, pylons 132a, 132b, rotors 134a, 134b, a tail boom 135, and a tail wing assembly 136. Any of these components may be shaped in any form which allows for the use of components of lift to resist gravity and/or move the aerial vehicle 130 forward.

The main wing 131 may provide a primary lift force for the aerial vehicle 130. The main wing 131 may be one or more rigid or flexible airfoils, and may include various control surfaces, such as winglets, flaps, rudders, elevators, etc. The control surfaces may be used to stabilize the aerial vehicle 130 and/or reduce drag on the aerial vehicle 130 during hover flight, forward flight, and/or crosswind flight.

The main wing 131 and pylons 132a, 132b may be any suitable material for the aerial vehicle 130 to engage in hover flight, forward flight, and/or crosswind flight. For example, the main wing 131 and pylons 132a, 132b may include carbon fiber and/or e-glass, and include internal supporting spars or other structures. Moreover, the main wing 131 and pylons 132a, 132b may have a variety of dimensions. For example, the main wing 131 may have one or more dimensions that correspond with a conventional wind turbine blade. As another example, the main wing 131 may have a span of 8 meters, an area of 4 meters squared, and an aspect ratio of 15.

The pylons 132a, 132b may connect the rotors 134a, 134b to the main wing 131. In some examples, the pylons 132a, 132b may take the form of, or be similar in form to, a lifting body airfoil (e.g., a wing). In some examples, a vertical spacing between corresponding rotors (e.g., rotor 134a and rotor 134b on pylon 132a) may be 0.9 meters.

The rotors 134a, 134b may be configured to drive one or more generators for the purpose of generating electrical energy. In this example, the rotors 134a, 134b may each include one or more blades, such as three blades or four blades. The rotor blades may rotate via interactions with the wind and be used to drive the one or more generators. In addition, the rotors 134a, 134b may also be configured to provide thrust to the aerial vehicle 130 during flight. With this arrangement, the rotors 134a, 134b may function as one or more propulsion units, such as a propeller. Although the rotors 134a, 134b are depicted as four rotors in this example, in other examples the aerial vehicle 130 may include any number of rotors, such as less than four rotors or more than four rotors.

The tail boom 135 may connect the main wing 131 to the tail wing assembly 136, which may include a tail wing and a vertical stabilizer. The tail boom 135 may have a variety of dimensions. For example, the tail boom 135 may have a length of 2 meters. Moreover, in some implementations, the tail boom 135 could take the form of a body and/or fuselage of the aerial vehicle 130. In such implementations, the tail boom 135 may carry a payload.

The tail wing and/or vertical stabilizer may be used to stabilize the aerial vehicle and/or reduce drag on the aerial vehicle 130 during hover flight, forward flight, and/or crosswind flight. For example, the tail wing and/or vertical stabilizer 136 may be used to maintain a pitch of the aerial vehicle 130 during hover flight, forward flight, and/or crosswind flight. The tail wing assembly 135 may have a variety of dimensions. For example, the tail wing assembly 135 may have a length of 2 meters. Moreover, in some examples, the tail wing assembly 135 may have a surface area of 0.45 meters squared. Further, in some examples, the tail wing assembly 135 may be located 1 meter above a center of mass of the aerial vehicle 130.

While the aerial vehicle 130 has been described above, it should be understood that the methods and systems described herein could involve any suitable aerial vehicle that is connected to an airborne wind turbine tether, such as the tether 120.

B. Transitioning an Aerial Vehicle from Hover Flight to Crosswind Flight

Figure 3:
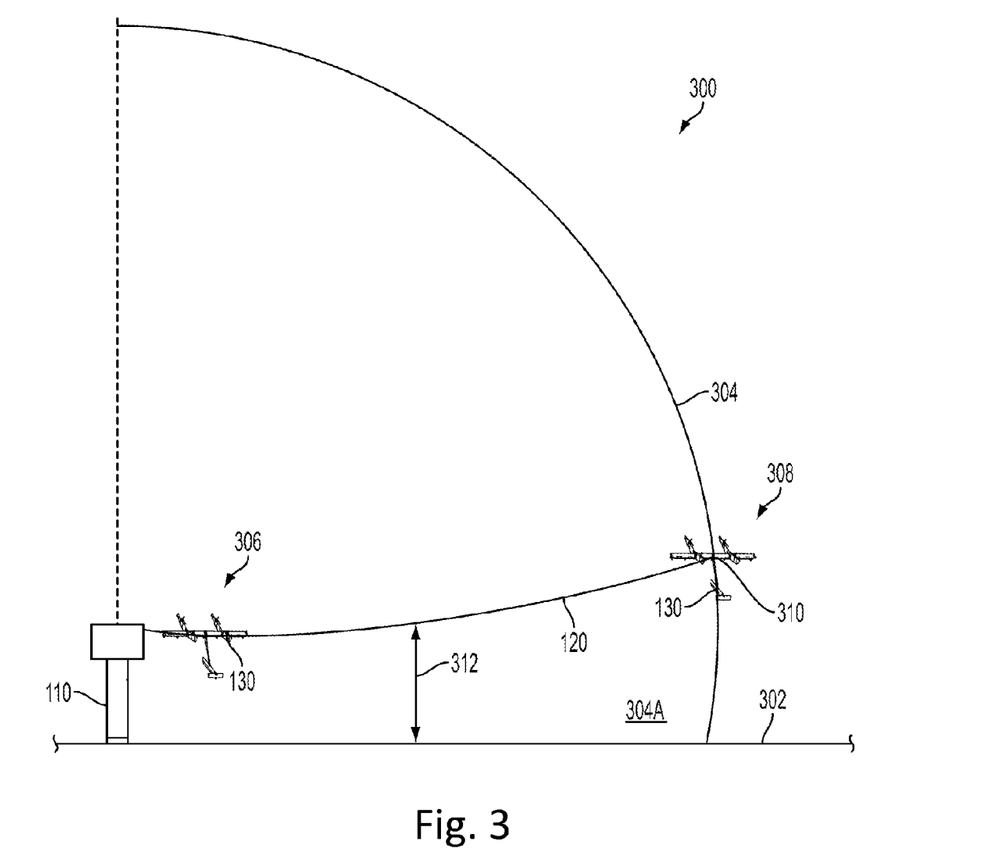
FIG. 3 depicts an example of an aerial vehicle transitioning from hover flight to crosswind flight.

FIG. 3 depicts an example 300 of transitioning an aerial vehicle from hover flight to crosswind flight, such as crosswind flight substantially along path 150, according to an example embodiment. Example 300 is generally described by way of example as being carried out by the aerial vehicle 130 described above in connection with FIG. 1. For illustrative purposes, example 300 is described in a series of actions as shown in FIG. 3, though example 300 could be carried out in any number of actions and/or combination of actions.

As shown in FIG. 3, the aerial vehicle 130 may be connected to the tether 120, and the tether 120 may be connected to the ground station 110. The ground station 110 may be located on ground 302. The tether 120 may define a tether sphere 304 having a radius based on a length of the tether 120, such as a length of the tether 120 when it is extended. Example 300 may be carried out in and/or substantially on a portion 304A of the tether sphere 304. The term "substantially on," as used in this disclosure, refers to exactly on and/or one or more deviations from exactly on that do not significantly impact transitioning an aerial vehicle between certain flight modes as described herein.

Example 300 begins at a point 306 with deploying the aerial vehicle 130 from the ground station 110 in a hover-flight orientation, and one or more rotors may be operating in a thrust mode. With this arrangement, the tether 120 may be paid out and/or reeled out. In some implementations, the aerial vehicle 130 may be deployed when wind speeds increase above a threshold speed (e.g., 3.5 m/s) at a threshold altitude (e.g., over 200 meters above the ground 302).

Further, at point 306 the aerial vehicle 130 may be operated in the hover-flight orientation. When the aerial vehicle 130 is in the hover-flight orientation, the aerial vehicle 130 may engage in hover flight. For instance, when the aerial vehicle 130 engages in hover flight, the aerial vehicle 130 may ascend, descend, and/or hover over the ground 302. When the aerial vehicle 130 is in the hover-flight orientation, a span of the main wing 131 of the aerial vehicle 130 may be oriented substantially perpendicular to the ground 302. The term "substantially perpendicular," as used in this disclosure, refers to exactly perpendicular and/or one or more deviations from exactly perpendicular that do not significantly impact transitioning an aerial vehicle between certain flight modes as described herein.

Example 300 continues at a point 308 while the aerial vehicle 130 is in the hover-flight orientation positioning the aerial vehicle 130 at a first location 310 that is substantially on the tether sphere 304. As shown in FIG. 3a, the first location 310 may be in the air and substantially downwind of the ground station 110.

The term "substantially downwind," as used in this disclosure, refers to exactly downwind and/or one or more deviations from exactly downwind that do not significantly impact transitioning an aerial vehicle between certain flight modes as described herein.

For example, the first location 310 may be at a first angle from an axis extending from the ground station 110 that is substantially parallel to the ground 302. In some implementations, the first angle may be 30 degrees from the axis. In some situations, the first angle may be referred to as azimuth.

As another example, the first location 310 may be at a second angle from the axis. In some implementations, the second angle may be 10 degrees from the axis. In some situations, the second angle may be referred to as elevation, and the second angle may be between 10 degrees in a direction above the axis and 10 degrees in a direction below the axis. The term "substantially parallel," as used in this disclosure refers to exactly parallel and/or one or more deviations from exactly parallel that do not significantly impact transitioning an aerial vehicle between certain flight modes described herein.

At point 308, the aerial vehicle 130 may accelerate in the hover-flight orientation. For example, at point 308, the aerial vehicle 130 may accelerate up to a few meters per second. In addition, at point 308, the tether 120 may take various different forms in various different embodiments. With this arrangement, the tether 120 may be in a catenary configuration. Moreover, a bottom of the tether 120 may be a predetermined altitude 312 above the ground 302. With this arrangement, at point 306 and point 308 the tether 120 may not contact the ground 302.

Example 300 continues with transitioning the aerial vehicle 130 from the forward-flight orientation to a crosswind-flight orientation. In some examples, transitioning the aerial vehicle 130 from the forward-flight orientation to the crosswind-flight orientation may involve a flight maneuver.

When the aerial vehicle 130 is in the crosswind-flight orientation, the aerial vehicle 130 may engage in crosswind flight. For instance, when the aerial vehicle 130 engages in crosswind flight, the aerial vehicle 130 may fly substantially along a path, such as path 150, to generate electrical energy. In some implementations, a natural roll and/or yaw of the aerial vehicle 130 may occur during crosswind flight.

III. ILLUSTRATIVE COOLING SYSTEM CONFIGURATIONS

As used herein, the terms motor, generator, and motor/generator are not meant to be exclusive. For example, the use of the term "motor" does not preclude an airborne wind turbine motor from also functioning as a generator, and a motor/generator does not have to function as both a motor and a generator.

Figure 4:
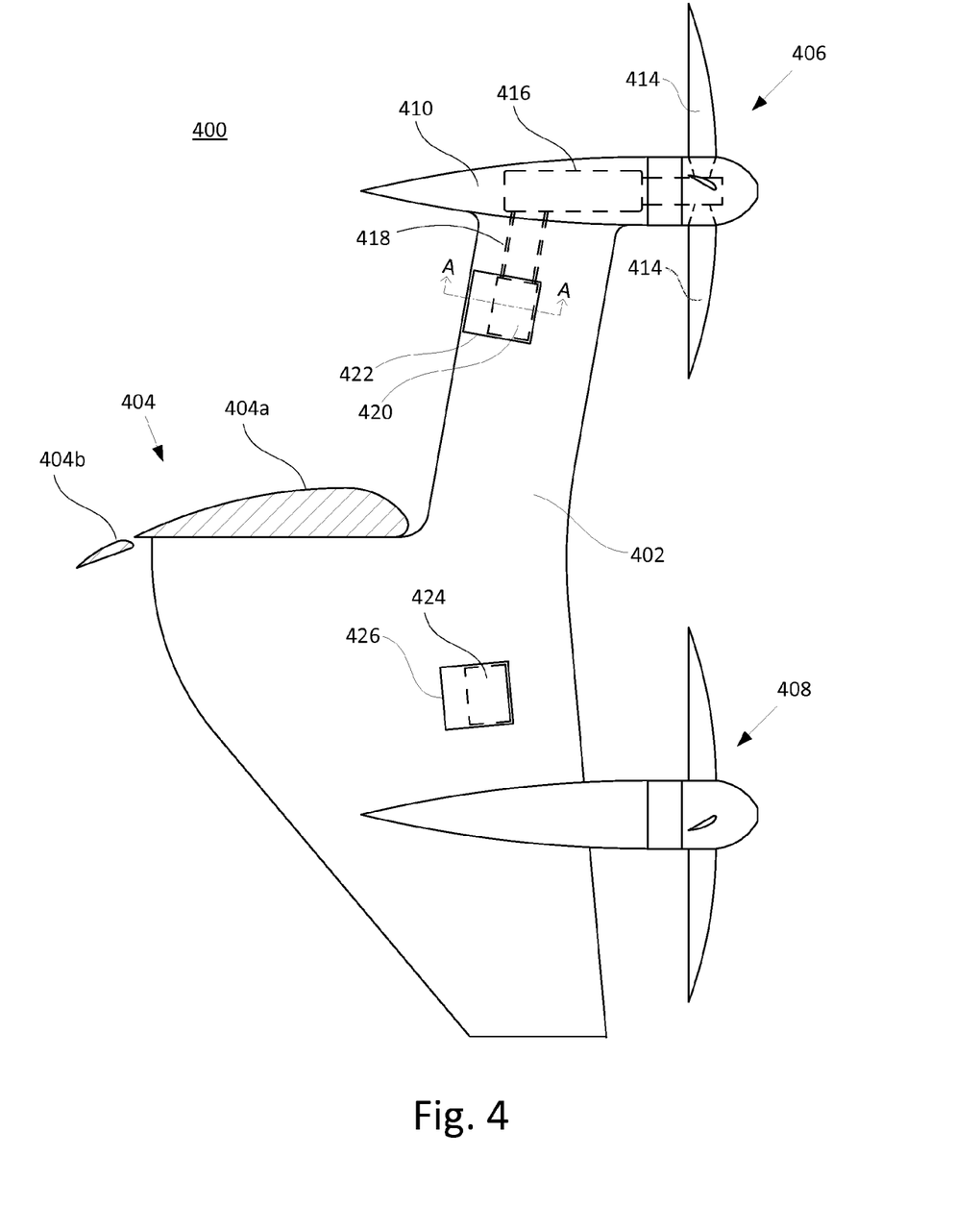
FIG. 4 depicts a cross-section of an aerial vehicle.

FIG. 4 illustrates a cross-section of an aerial wind turbine aerial vehicle 400, such as the aerial vehicle 130 described with respect to FIG. 1. Aerial vehicle 400 is shown in side view at pylon 402, with a cross-section through main wing 404. Main wing 404 may comprise multiple lift-generating airfoil sections, such as main airfoil 404a and trailing airfoil 404b. Pylon 402 may also act as a lift generating airfoil, and may have a cross-sectional shape similar to that of main airfoil 404a, though the generated lift may be oriented orthogonal (or at some other angle) to the generated lift of main wing 404. As illustrated, the high-pressure surface of pylon 402 is the side shown.

Pylon 402 may support multiple rotor assemblies. For example, pylon 402 is shown with upper rotor assembly 406 and lower rotor assembly 408, though more or fewer rotor assemblies are contemplated. Rotor assemblies 406, 408 may be capable of producing thrust, such as when the aerial vehicle is taking off or landing, and/or drag, such as when the aerial vehicle is flying at a large forward velocity in crosswind flight. Employing rotor assembly 406 as a representative example of other rotor assemblies, rotor assembly 406 may include nacelle 410 and motor/generator 416, which may be connected to a set of rotor blades 414. Motor/generator 416 may be coupled to radiator 420 which may be located in radiator duct 422, either or both of which may be external to pylon 402, but are preferably partially or fully enclosed within pylon 402. Radiator 420 may be coupled to motor/generator 416 via coolant lines 418, such as flexible hoses, semi-rigid tubes, or rigid pipes. (Additionally shown are radiator 424 and radiator duct 426, which may be similarly or identically connected to a motor/generator in rotor assembly 408.) The disclosed radiator locations beneficially may allow the use of a very simple radiator which may be flat in planform. If radiators (and any accompanying radiator ducts) were instead placed on a rotor assemble nacelle, they must have either complex inlet geometry or complex radiator geometry in order to account for the shape of the nacelle.

Figure 5:
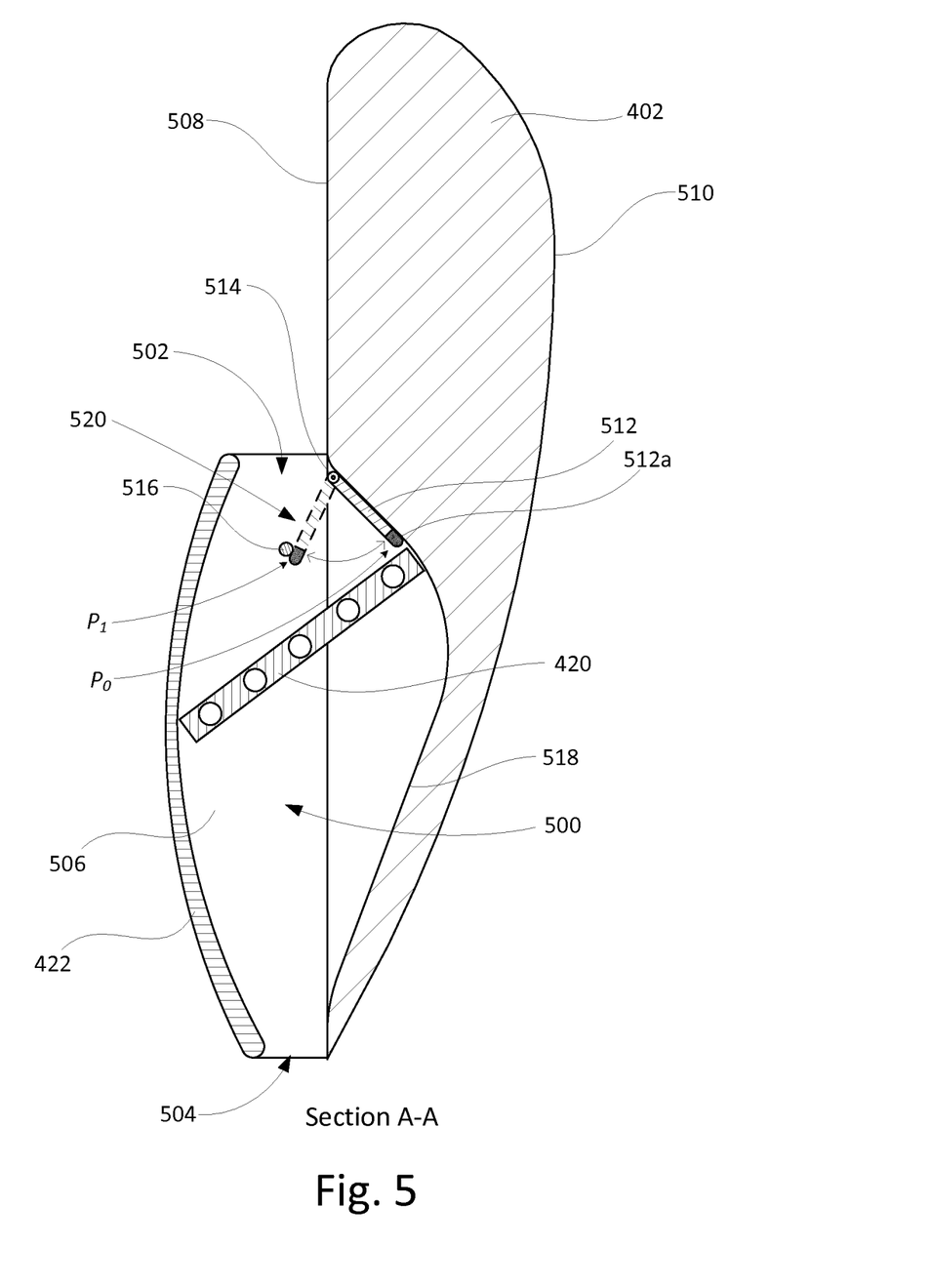
FIG. 5 depicts a cross-section of an aerial vehicle cooling system.

FIG. 5 illustrates a cross-section view A-A of FIG. 4 and shows an exemplary radiator 420 and radiator duct 500. Radiator 420 may reside in radiator duct 500. Duct 500 may include an internal duct surface 518 of pylon 402, an external duct cover 422, a duct side panel 506, and another duct side panel (not illustrated in cross-section view A-A), all of which may serve to form an internal cavity of duct 500. Further illustrated are an airflow inlet 502 and an airflow outlet 504 of the duct 700. Duct 500 may be located on the high pressure surface 508 of pylon 402, so that the opposing low pressure lifting surface 510 (i.e., suction surface) of pylon 402 remains undisturbed, and also so inlet 502 is in lower speed but higher stagnation pressure air. This may reduce the drag created by radiator 420 and duct 500. Radiator 420 may be set within duct 500 at an angle to the mean airflow direction. Because radiator 420 may have a high pressure loss, it need not be aligned with the flow to get roughly uniform inlet velocity. This beneficially allows a wider radiator to be fit in a smaller duct cross-section size.

FIG. 5 also illustrates moveable flow restrictor 520 in an open position $P_0$ and a closed position $P_1$. Flow restrictor 520 may be located at the airflow inlet 502 and may include elements 512 and 514. Element 512 may be a rigid member that rotates about or along element 514 to move between open position $P_0$ and a closed position $P_1$. Element 514 may be, for example, a flexure or radial bearing. Alternatively, element 512 may be a flexible portion and element 514 may be a fixed portion, where the fixed portion is attached to the aerial vehicle via, for example, pylon 402 or duct surface 518, and where the flexible portion may bend to allow element 512 to move between open position $P_0$ and a closed position $P_1$. Optionally, element 512 may include a weighted portion 512a.

As an operational example, during hover flight flow restrictor 520 may be subject to little or no g-forces in a direction normal to, for example, high pressure surface 508. As a result, flow restrictor 520 may naturally rest in open position $P_0$ as a result of tension from element 514, gravity and the orientation of aerial vehicle, and/or airflow. However, when the aerial vehicle transitions to crosswind flight, the g-forces may climb significantly and cross a predetermined threshold value in a particular triggering direction. For example, the g-forces may increase significantly in a direction normal to the high-pressure surface 508. (The triggering direction may include a limited range of directions, for example, the triggering direction could be ±30° from a direction exactly normal to high-pressure surface 508.) This shift in g-forces may cause element 512 to move against a hardstop 516 and thus flow restrictor 520 would move from an open position P1 to a closed position $P_1$, reducing the relative amount of airflow into the airflow inlet 502. Optionally, by adding or subtracting weight to weighted portion 514a, the responsiveness of flow restrictor 520 may be tuned, thus changing the threshold g-force value and/or the triggering direction.

G-forces are not the only example of a flight condition that can be harnessed to cause flow restrictor 520 to move. As another example, airflow velocity can be used as a passive control mechanism. As airflow velocity increases, static pressure may build in areas of the duct cavity. When static pressure on the internal side of element 512 exceeds static pressure on the external side of element 512, element 512 will move from open position $P_O$ to closed position $P_1$. Accordingly, the shape of element 512 and internal surface 518 may be configured to tune the threshold value of airflow velocity that will cause flow restrictor 520 to move from open to closed and back to open.

Figure 6:
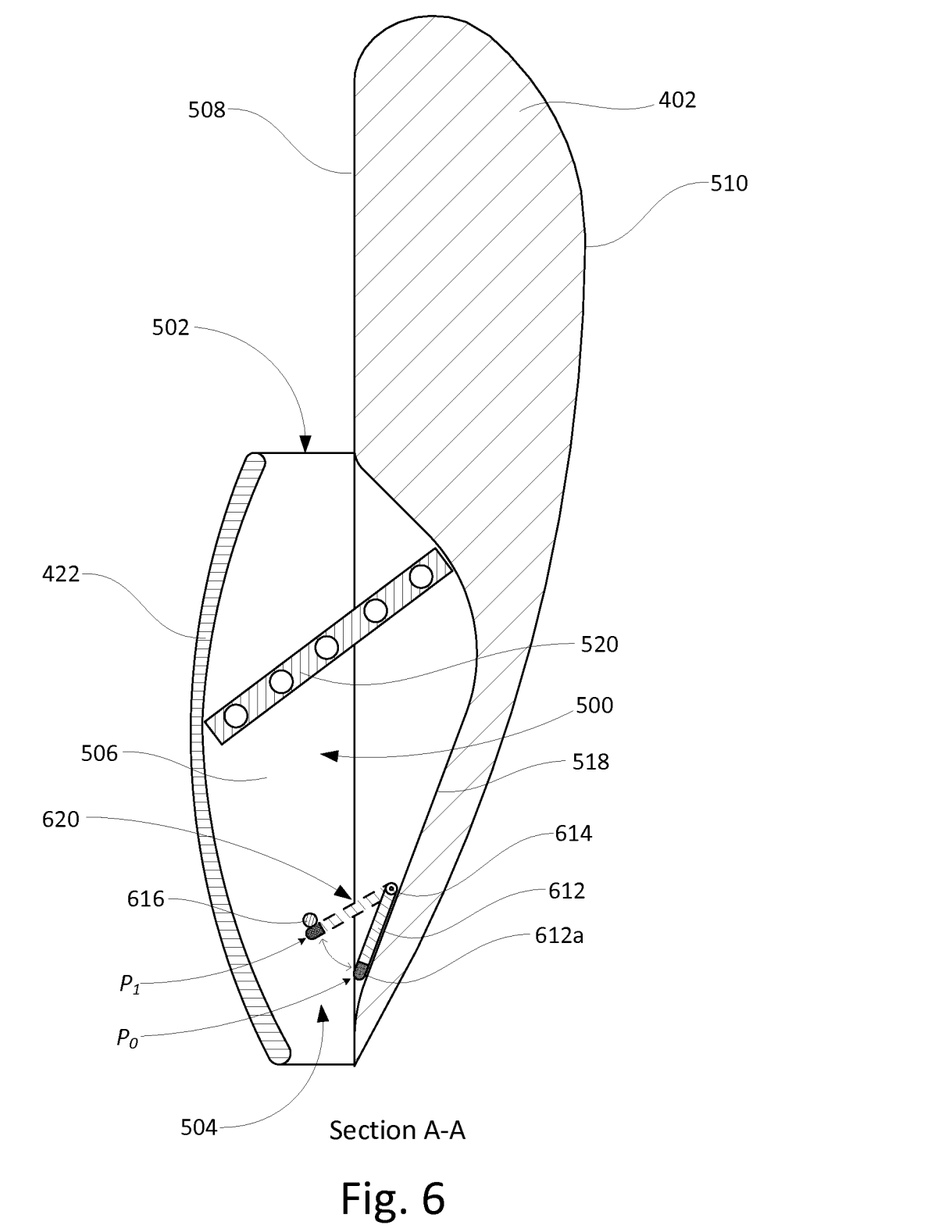
FIG. 6 depicts a cross-section of an aerial vehicle cooling system.

FIG. 6 illustrates another moveable flow restrictor. Whereas flow restrictor 520 was located at the airflow inlet 502, flow restrictor 620 is located at the airflow outlet 504. Flow restrictor 620 functions similarly to flow restrictor 520, except that it causes a change in airflow across radiator 420 by restricting airflow through outlet 504 instead of through inlet 502. Flow restrictor 620 includes elements 612 and 614, which function similarly to elements 512 and 514, as well as weighted portion 612a which may be used to tune flow restrictor 620 in the same manner as flow restrictor 520, and hardstop 616 which may function similarly to hardstop 516.

Figure 7:
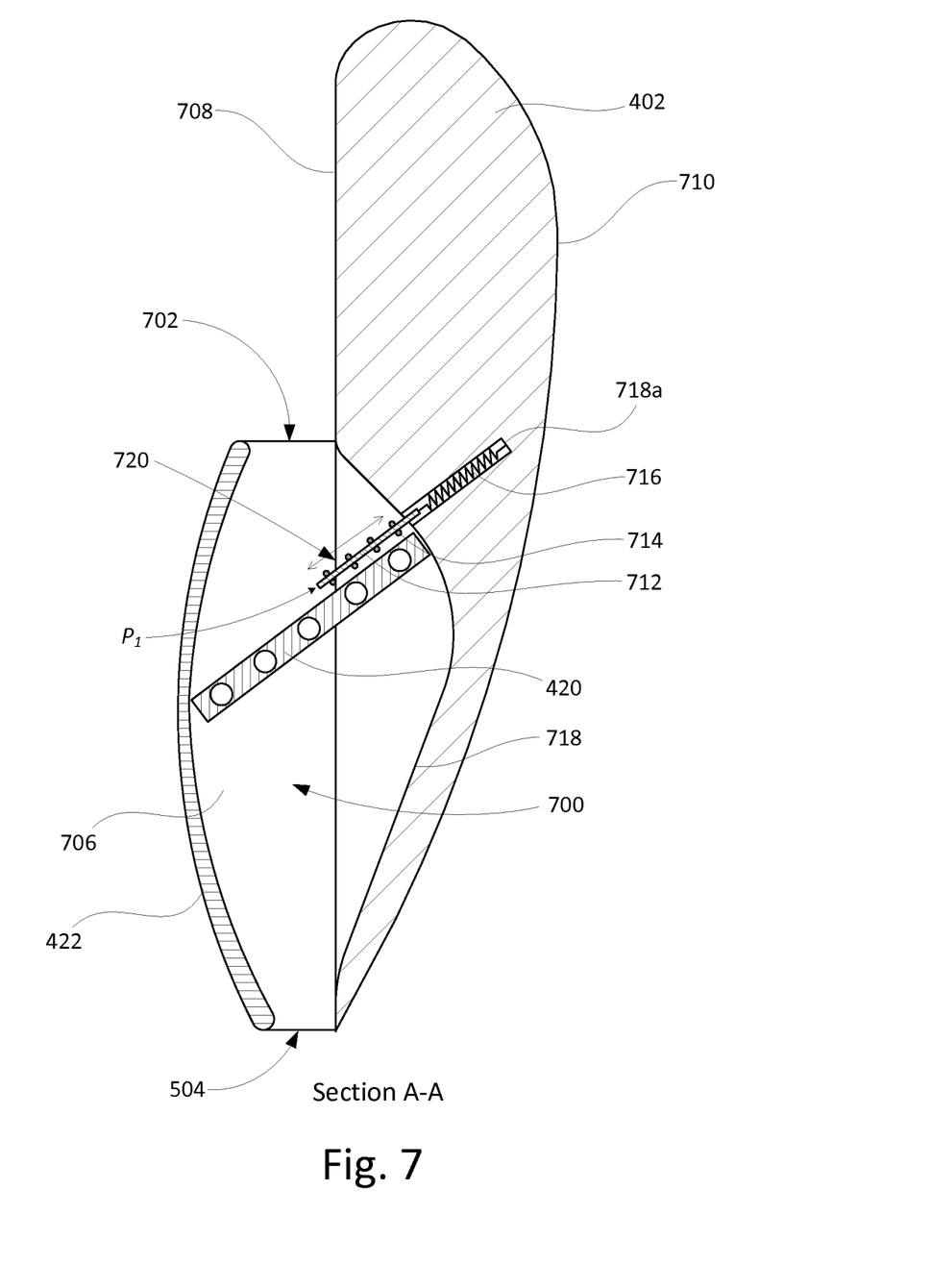
FIG. 7 depicts a cross-section of an aerial vehicle cooling system.

FIG. 7 illustrates another exemplary cross-section view A-A of FIG. 4 and shows an exemplary radiator 420 and radiator duct 700. Similar to FIG. 5, radiator 420 may reside in radiator duct 700. Duct 700 may include an internal duct surface 718 of pylon 402, an external duct cover 422, a duct side panel 706, and another duct side panel (not illustrated in cross-section view A-A), all of which may serve to form an internal cavity of duct 700. Further illustrated are an airflow inlet 702 and an airflow outlet 704 of duct 700. Duct 700 may be located on the high pressure surface 708 of pylon 402.

FIG. 7 also illustrates moveable flow restrictor 720 in an open position $P_1$. Flow restrictor 720 includes a blocking slat 712, guides 714, spring 716, and receiving cavity 718a. In a closed position, blocking slat 712 may be pulled into the receiving cavity 718a by spring 716. In open position $P_1$, blocking slat 712 may extend out from receiving cavity 718a and may be guided to and held in position by guides 714. Guides 714 may be, for example, mounted radial or plain bearings. Similarly to flow restrictors 520 and 620, flight conditions such as g-force loading in a triggering direction parallel or approximately parallel to the direction of travel of blocking slat 712 can be harnessed to actuate flow restrictor 720. Further, the weight of blocking slat 712 and the tension of spring 716 can be used to tune the triggering threshold for activation of flow restrictor 720.

Figure 8:
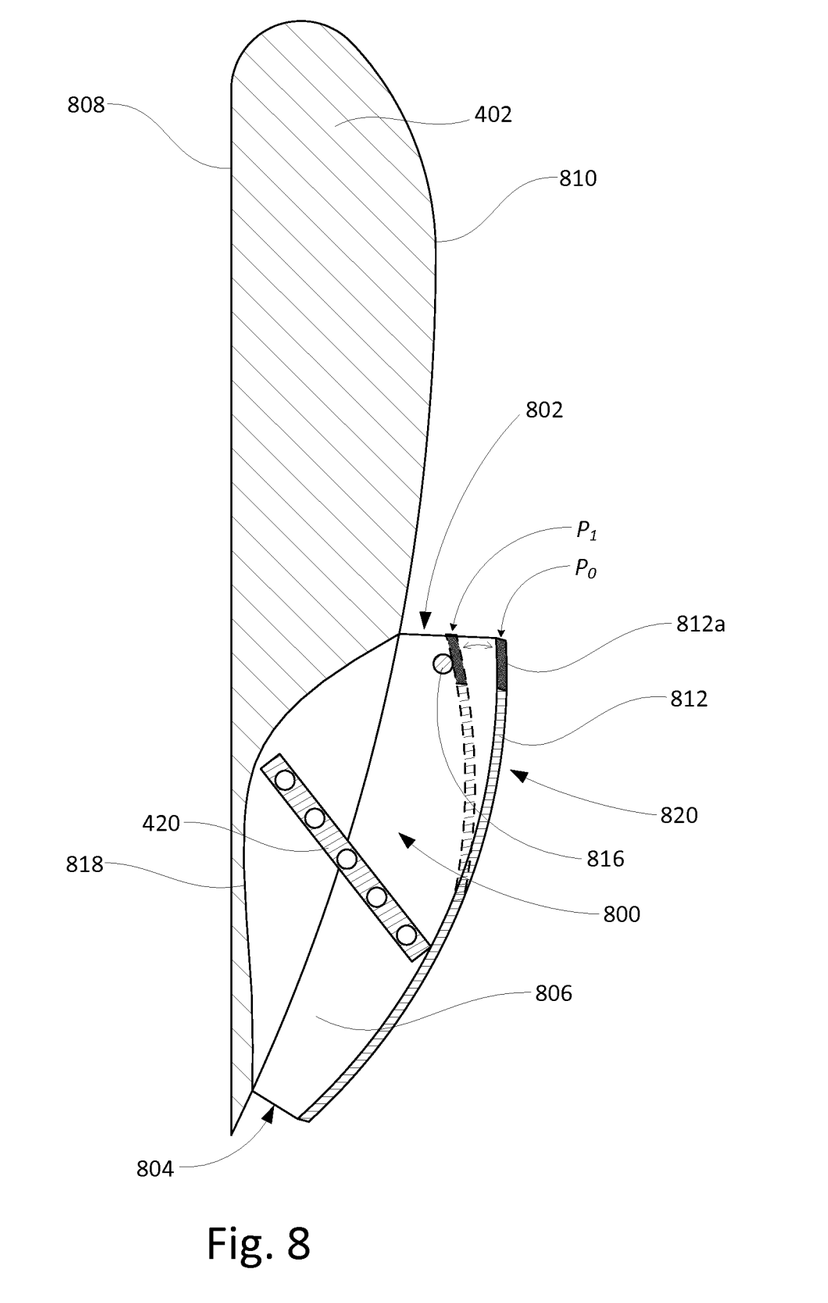
FIG. 8 depicts a cross-section of an aerial vehicle cooling system.

FIG. 8 illustrates another exemplary cross-section view A-A of FIG. 4 and shows an exemplary radiator 420 and radiator duct 800. Radiator 420 may reside in radiator duct 800. Duct 800 may include an internal duct surface 818 of pylon 402, an external duct cover 812, a duct side panel 806, and another duct side panel (not illustrated in cross-section view A-A), all of which may serve to form an internal cavity of duct 800. Further illustrated are an airflow inlet 802 and an airflow outlet 804 of duct 800. Duct 800 may be located on the low pressure surface 810 of pylon 402.

As illustrated in FIG. 8, external duct cover 812 may serve as part of moveable flow restrictor 820. External duct cover 812 may be a flexible member and a portion may be fixed to the aerial vehicle via pylon 402 or duct side panels (including panel 806) or other components of the aerial vehicle. Another portion of external duct cover 812 may be allowed to move, such that it can transition between an open position $P_O$ and a closed position $P_1$.

During, for example hover flight, flow restrictor 820 may be subject to little or no g-forces in a direction normal to high pressure surface 808. As a result, flow restrictor 820 may naturally rest in open position $P_O$ as a result of the shape and stiffness of external duct cover 812, gravity and the orientation of aerial vehicle, and/or airflow. However, when the aerial vehicle transitions to crosswind flight, the g-forces may climb significantly and cross a predetermined threshold value in a particular triggering direction. For example, the g-forces may increase significantly in a direction normal to the high-pressure surface 808. This shift in g-forces may cause the element 812 to move against a hardstop 816 and thus flow restrictor 820 would be in closed position $P_1$, reducing the relative amount of airflow into the airflow inlet 502. The weighted portion 814a may be used to tune the responsiveness of flow restrictor 820 by adding or subtracting weight, thus changing the threshold g-force value and/or the triggering direction. Further the triggering direction may include a limited range of directions, for example, the triggering direction could be ±30° from a direction exactly normal to high pressure surface 808.

IV. CONCLUSION

The particular arrangements shown in the Figures should not be viewed as limiting. For example, relative sizes of components, dimensions, and specifically illustrated locations are intended to be exemplary only and are not intended to be limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

I claim:
1. A system comprising:
an aerial vehicle, wherein the aerial vehicle includes a radiator duct, and wherein the radiator duct comprises an airflow inlet, and internal cavity, and an airflow outlet;
a radiator located within the internal cavity of the radiator duct and subject to an airflow through the radiator duct; and
a moveable flow restrictor located at the airflow outlet, wherein the moveable flow restrictor comprises: (i) a rigid member, and (ii) a bearing, wherein the rigid member is coupled to the bearing, wherein the rigid member is rotatable via the bearing between an open position and a closed position, wherein the rigid member is oriented in the open position while subject to a g-force less than a threshold value in a triggering direction, and wherein the rigid member is oriented in the closed position while subject to a g-force greater than the threshold value in the triggering direction, wherein an amount of the airflow while the rigid member is in the open position is different than an amount of the airflow while the rigid member is in the closed position.

2. The system of claim 1, wherein the bearing comprises a flexure bearing, wherein a portion of the flexure bearing is fixed to the aerial vehicle.

3. The system of claim 1, wherein the bearing comprises a radial bearing, wherein the radial bearing rotates about a shaft fixed to the aerial vehicle.

4. The system of claim 1, wherein the moveable flow restrictor is positioned at least partially inside the internal cavity of the radiator duct.

\* \* \* \* \*